US008526327B2

(12) United States Patent
Schilling

(10) Patent No.: US 8,526,327 B2
(45) Date of Patent: Sep. 3, 2013

(54) SPREAD-SPECTRUM COMMUNICATION UNIT

(75) Inventor: Donald L. Schilling, Sands Point, NY (US)

(73) Assignee: InterDigital Technology Corporation, Wilmington, DE (US)

(*) Notice: Subject to any disclaimer, the term of this patent is extended or adjusted under 35 U.S.C. 154(b) by 208 days.

(21) Appl. No.: 12/497,973

(22) Filed: Jul. 6, 2009

(65) Prior Publication Data

US 2009/0274194 A1  Nov. 5, 2009

Related U.S. Application Data

(63) Continuation of application No. 11/429,386, filed on May 5, 2006, now Pat. No. 7,564,808, which is a continuation of application No. 09/994,290, filed on Nov. 26, 2001, now Pat. No. 7,054,278, which is a continuation of application No. 09/878,647, filed on Jun. 11, 2001, now Pat. No. 6,356,534, which is a continuation of application No. 09/133,047, filed on Aug. 13, 1998, now Pat. No. 6,295,288, which is a continuation of application No. 08/814,809, filed on Mar. 10, 1997, now Pat. No. 5,926,465, which is a continuation of application No. 08/268,186, filed on Jun. 29, 1994, now Pat. No. 5,610,906.

(51) Int. Cl.
*H04L 12/28* (2006.01)

(52) U.S. Cl.
USPC .......................................... 370/254; 370/261

(58) Field of Classification Search
None
See application file for complete search history.

(56) References Cited

U.S. PATENT DOCUMENTS

| | | | |
|---|---|---|---|
| 3,731,198 A | 5/1973 | Blasbalg | |
| 3,761,817 A | 9/1973 | Kaltschmidt et al. | |
| 4,174,501 A | 11/1979 | Chastagnier et al. | |
| 4,222,115 A | 9/1980 | Cooper et al. | |
| 4,279,018 A | 7/1981 | Carson | |
| 4,320,395 A | 3/1982 | Meissen et al. | |
| 4,519,069 A | 5/1985 | Pudsey | |
| 4,520,404 A | 5/1985 | Von Kohorn | |
| 4,640,990 A | 2/1987 | Kawade et al. | |
| 4,684,949 A | 8/1987 | Kalafus | |
| 4,706,081 A * | 11/1987 | Hart et al. | 370/254 |
| 4,765,753 A | 8/1988 | Schmidt | |
| 4,799,252 A | 1/1989 | Eizenhoffer et al. | |
| 4,901,307 A | 2/1990 | Gilhousen et al. | |
| 4,914,651 A | 4/1990 | Lusignan | |
| 4,941,150 A * | 7/1990 | Iwasaki | 375/145 |

(Continued)

FOREIGN PATENT DOCUMENTS

| EP | 0 596 699 | 5/1994 |
|---|---|---|
| EP | 0 600 710 | 8/1994 |

*Primary Examiner* — Robert Wilson
(74) *Attorney, Agent, or Firm* — Volpe and Koenig, P.C.

(57) ABSTRACT

A set of spread-spectrum units is capable of operating as a base station or as a remote unit. Each spread-spectrum unit includes a base subunit or a remote subunit, each subunit having a receiver for receiving spread-spectrum signals at a first frequency transmitted from the spread-spectrum units; a signal despreader for despreading the spread-spectrum; a demodulator for demodulating the despread-spread-spectrum signals; a combiner for combining the demodulated signals, and a local signal; a converter for converting the combined signal to a base-data signal; a spread-spectrum circuit for processing the base-data signal; and a transmitter for transmitting at a second frequency the processed base-data signal as a base-spread-spectrum signal.

16 Claims, 5 Drawing Sheets

(56) References Cited

U.S. PATENT DOCUMENTS

| | | |
|---|---|---|
| 4,977,578 A | 12/1990 | Ishigaki et al. |
| 4,979,170 A | 12/1990 | Gilhousen et al. |
| 5,005,183 A | 4/1991 | Carey et al. |
| 5,040,238 A | 8/1991 | Comroe et al. |
| 5,056,109 A | 10/1991 | Gilhousen et al. |
| 5,073,900 A | 12/1991 | Mallinckrodt |
| 5,101,501 A | 3/1992 | Gilhousen et al. |
| 5,109,390 A | 4/1992 | Gilhousen et al. |
| 5,166,951 A | 11/1992 | Schilling |
| 5,179,572 A | 1/1993 | Schilling |
| 5,185,762 A | 2/1993 | Schilling |
| 5,191,593 A | 3/1993 | Pickert et al. |
| 5,218,618 A | 6/1993 | Sagey |
| 5,224,094 A | 6/1993 | Maher |
| 5,257,283 A | 10/1993 | Gilhousen et al. |
| 5,263,045 A | 11/1993 | Schilling |
| 5,265,119 A | 11/1993 | Gilhousen et al. |
| 5,428,636 A * | 6/1995 | Meier ............................ 375/132 |
| 5,469,471 A | 11/1995 | Wheatley, III |
| 5,563,895 A * | 10/1996 | Malkamaki et al. .......... 714/748 |
| 5,586,167 A | 12/1996 | Handforth |
| 5,610,906 A * | 3/1997 | Schilling ........................ 370/261 |
| 5,914,949 A | 6/1999 | Li |
| 5,926,465 A * | 7/1999 | Schilling ........................ 370/261 |
| 6,052,048 A * | 4/2000 | Cattaneo ........................ 336/178 |
| 6,132,306 A | 10/2000 | Trompower |
| 6,141,372 A | 10/2000 | Chalmers |
| 6,295,288 B1 * | 9/2001 | Schilling ........................ 370/342 |
| 6,356,534 B2 * | 3/2002 | Schilling ........................ 370/261 |
| 7,054,278 B2 * | 5/2006 | Schilling ........................ 370/261 |
| 7,110,444 B1 | 9/2006 | Sorrells et al. |
| 7,564,808 B2 * | 7/2009 | Schilling ........................ 370/261 |
| 2001/0030947 A1 * | 10/2001 | Schilling ........................ 370/260 |
| 2002/0034174 A1 * | 3/2002 | Schilling ........................ 370/342 |
| 2006/0203892 A1 * | 9/2006 | Schilling ........................ 375/141 |
| 2009/0274194 A1 * | 11/2009 | Schilling ........................ 375/143 |

* cited by examiner

SPREAD-SPECTRUM COMMUNICATION UNIT

This application is a continuation of U.S. patent application Ser. No. 11/429,386 filed May 5, 2006, now U.S. Pat. No. 7,564,808 which is a continuation of U.S. patent application Ser. No. 09/994,290, filed on Nov. 26, 2001, now U.S. Pat. No. 7,054,278 which is a continuation of U.S. patent application Ser. No. 09/878,647, filed on Jun. 11, 2001, now U.S. Pat. No. 6,356,534 which is a continuation of U.S. patent application Ser. No. 09/133,047, filed Aug. 13, 1998, now U.S. Pat. No. 6,295,288, which is a continuation of U.S. patent application Ser. No. 08/814,809, filed Mar. 10, 1997, now U.S. Pat. No. 5,926,465, which is a continuation of U.S. patent application Ser. No. 08/268,186, filed Jun. 29, 1994, now U.S. Pat. No. 5,610,906.

BACKGROUND

This invention relates to spread-spectrum communications, and more particularly, to a method and system for handing off a base station among a plurality of users in a spread-spectrum network.

Spread-spectrum modulation is a well developed art, in terms of generating chipping sequences, and spread-spectrum processing data signals with the chipping sequences. Using this technology, communication links may be established among a transmitter and a receiver in remote locations. Also, networks may be established, using a conference calling spread-spectrum technique. Conference calling spread-spectrum techniques are disclosed in U.S. Pat. No. 5,179,572 entitled SPREAD SPECTRUM CONFERENCE CALLING SYSTEM AND METHOD, to Schilling, and in U.S. Pat. No. 5,263,045, entitled SPREAD SPECTRUM CONFERENCE CALL SYSTEM AND METHOD, to Schilling.

A problem may exist where a spread-spectrum conference calling system is set up, but the base station may need to change hands. For example, in a military environment, a platoon may use spread-spectrum modulation for conference calling among the members of the platoon. A particular unit in the platoon may be designated as the base station. The cited prior art does not teach how to change a base station from one platoon to another or what would happen among units in the platoon in the event it became necessary to effectuate such a change.

SUMMARY

A communication unit comprises a command signal generator for generating a command signal. A transmitter transmits communication signals at one of two frequencies and for transmitting the command signal. A receiver receives communication signals at one of the two frequencies and for receiving the command signal. Upon initiation of the command signal, the command signal is transmitted for receipt by all active units in the system and the unit transmitting the command signal receives communication signals at a selected frequency of the two frequencies and transmits communication signals at another frequency. Upon reception of the command signal from another unit in the system, the unit receiving the command signal transmits a communication signal at the selected frequency of the two frequencies and receives communication signals at the another frequency.

BRIEF DESCRIPTION OF THE DRAWINGS

The accompanying drawings, which are incorporated in and constitute a part of the specification, illustrate preferred embodiments of the invention and together with the description serve to explain the principles of the invention.

DETAILED DESCRIPTION OF THE PREFERRED EMBODIMENTS

Figure 1A:
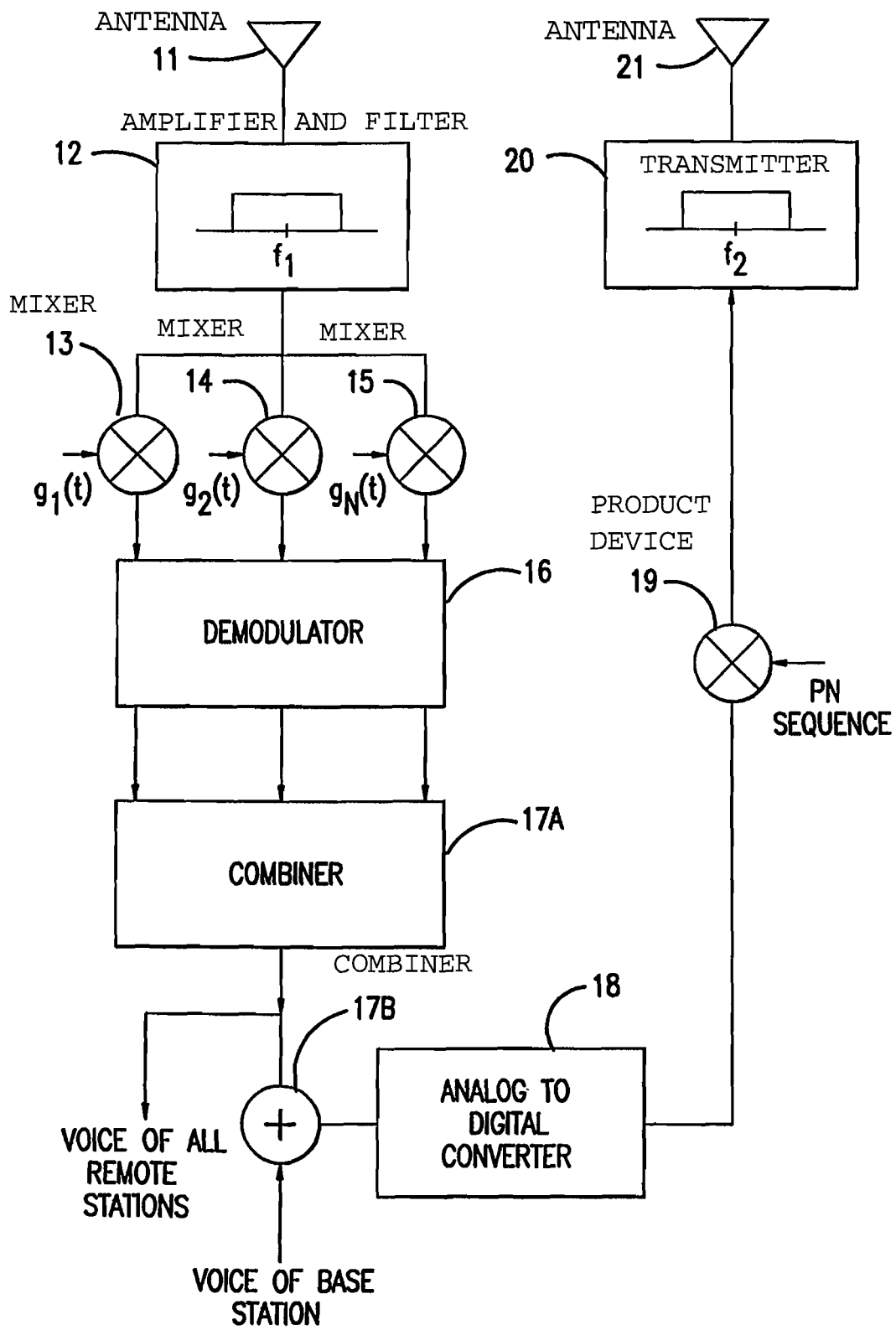
FIG. 1A is a block diagram of a base subunit using a plurality of mixers.

Reference now is made in detail to the present preferred embodiments of the invention, examples of which are illustrated in the accompanying drawings, wherein like reference numerals indicate like elements throughout the several views.

The present invention provides a unique solution to the problem of a plurality of spread spectrum units in use in a mobile environment in which any one of the spread-spectrum units is vulnerable to neutralization while maintaining communication between all the spread-spectrum units remains crucial. The spread-spectrum changeable base station finds application in a platoon of units, in an army environment, or in a law enforcement application, where a transportable base station might be set up for controlling a plurality of spread spectrum remote units. The problem being addressed for each of these applications is what happens when the base unit becomes disabled or nonfunctional. In the military environment, the base station may be destroyed. In a law enforcement situation, the mobility of the plurality of spread-spectrum units may have a requirement that the base station change from one unit to another.

The spread-spectrum system has a plurality of spread-spectrum units, with each spread-spectrum unit having a base subunit, a remote subunit, and a command subunit. The use of the term "subunits" for designating the base subunit, remote subunit, and command subunit, is for purposes of illustrating the invention. The invention may be built as one totally integrated unit, or as a mixture of more than one unit.

Figure 1B:
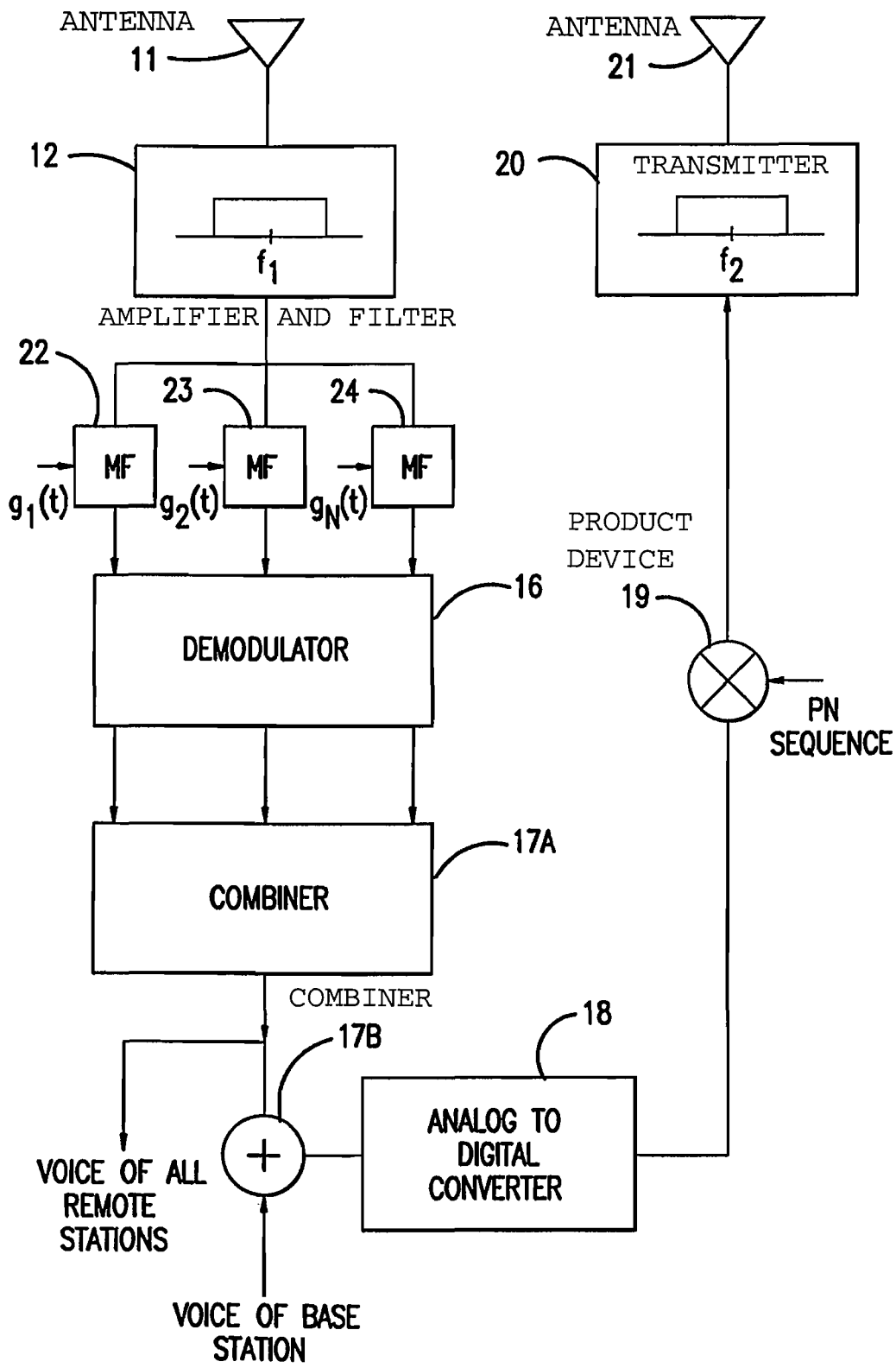
FIG. 1B is a block diagram of a base subunit using a plurality of matched filters.

The base subunit is illustratively shown in FIGS. 1A and 1B. The base subunit includes receiving means, despreading means, demodulating means, combining means, converting means, spread-spectrum processing means, and transmitting means. The despreading means is coupled between the receiving means and the demodulating means. The combining means is coupled to the demodulating means and the converting means. The spread-spectrum processing means is coupled to the converting means and the transmitting means.

The receiving means is shown in FIG. 1A as antenna 11 coupled to radio frequency/intermediate frequency (RF/IF) amplifier and filter section 12. The despreading means is illustrated as a plurality of mixers 13, 14, 15. As shown in FIG. 1B, the despreading means may also be embodied as a plurality of matched filters 22, 23, 24. Each of the plurality of mixers 13, 14, 15 has a chipping-sequence $g_1(t)$, $g_2(t)$, ..., $g_N(t)$, respectively, for mixing with the received spread-spectrum signal. The plurality of chipping sequences is matched to the chipping sequence of the desired spread-spectrum signal to be despread.

The demodulating means and combining means is shown as the demodulator 16 and combiners 17A, 17B. Combiners 17A, 17B may be a single combiner performing the combining function, or separate combiners. The converting means is shown as an analog-to-digital converter 18. The spread-spectrum processing means is illustrated as product device 19, having a chipping sequence for spreading the data signal from analog-to-digital converter 18. The transmitting means is illustrated as transmitter 20 and antenna 21.

The RF/IF amplifier and filter circuits 12 are coupled to the antenna 11 and to the plurality of mixers 13, 14, 15. The plurality of mixers 13, 14, 16 is coupled to the demodulator 16 and combiner 17A, 17B. The analog-to-digital converter 18 is coupled to the combiner 17B and to the product device 19. The transmitter 20 is coupled to the product device 19 and to antenna 21. Antenna 21 and antenna 11 may be the same antenna with the appropriate isolation circuits, or different antennas. The RF/IF amplifier and filter circuits 12 receive at a first frequency, $f_1$, a plurality of spread-spectrum signals transmitted from the plurality of spread-spectrum units. The plurality of spread-spectrum signals are despread by the plurality of mixers 13, 14, 15. As shown in FIG. 1B, the despreading means may also be embodied as a plurality of matched filters 22, 23, 24. The output of the plurality of mixers 13, 14, 15 is a plurality of despread-spread-spectrum signals. The demodulator 16 demodulates the plurality of despread-spread-spectrum signals to generate a plurality of demodulated signals. The combiner 17A combines the plurality of demodulated signals. The combined plurality of demodulated signals and a local signal from the base station may be combined by second combiner 17B to generate a combined signal. The term "combined signal", as used herein, is an analog signal including the voice of the base station and the combined demodulated signals of the combiners 17A, 17B.

The combined signal is converted to a base-data signal by analog-to-digital converter 18. The term "base-data signal," as used herein, is the digital signal coming from the analog-to-digital converter 18, and includes the converted analog signals and the data signal at the base station.

The product device 19 spread-spectrum processes the base-data signal from analog-to-digital converter 18, with a base-chipping sequence. The spread-spectrum-processed-base-data signal is transmitted as a base-spread-spectrum signal by transmitter 20 at the second frequency $f_2$. Antenna 11 and antenna 21 may be a single antenna, serving both the receiver and transmitter.

Figure 2A:
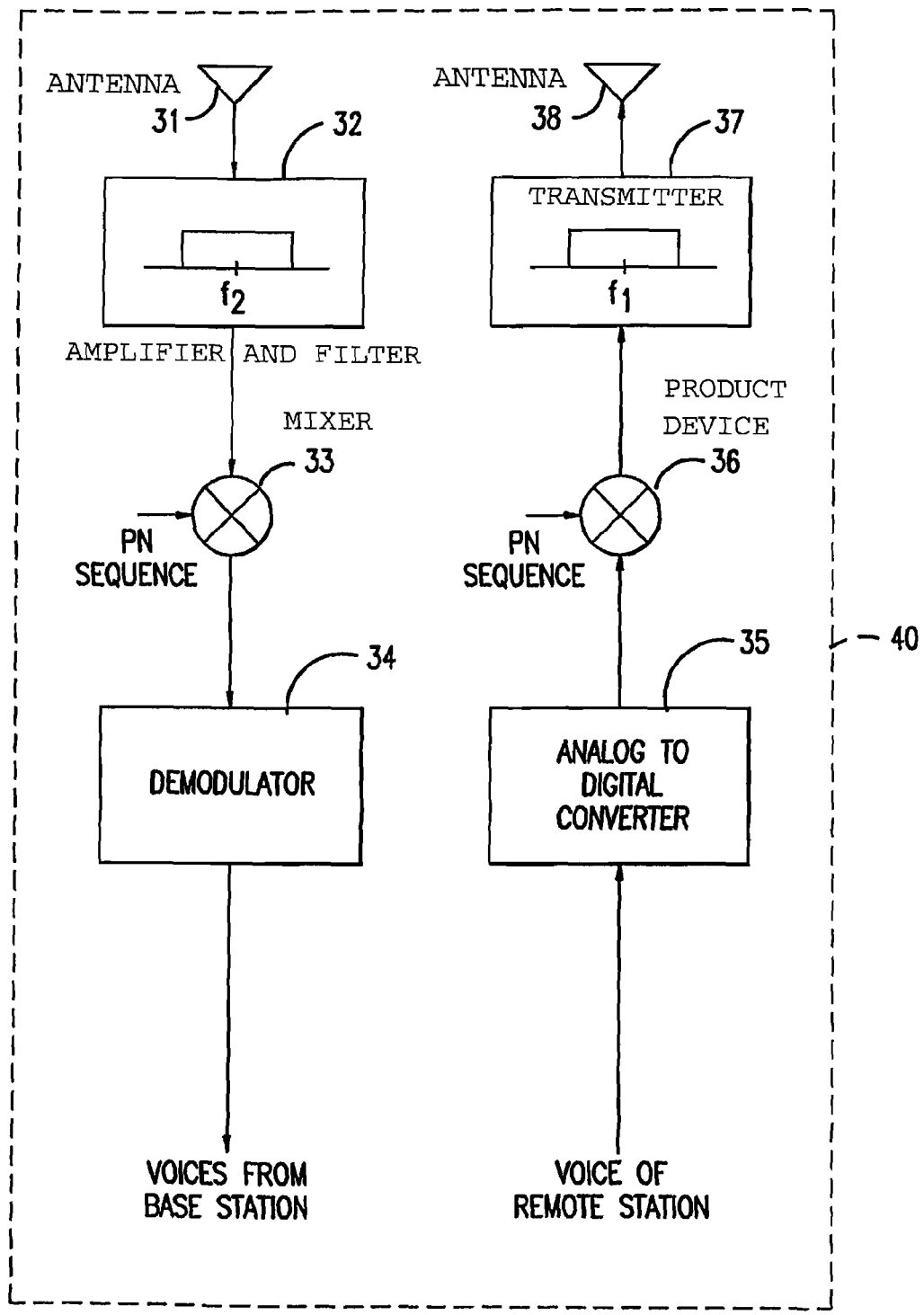
FIG. 2A is a block diagram of a remote subunit using a mixer.
Figure 2B:
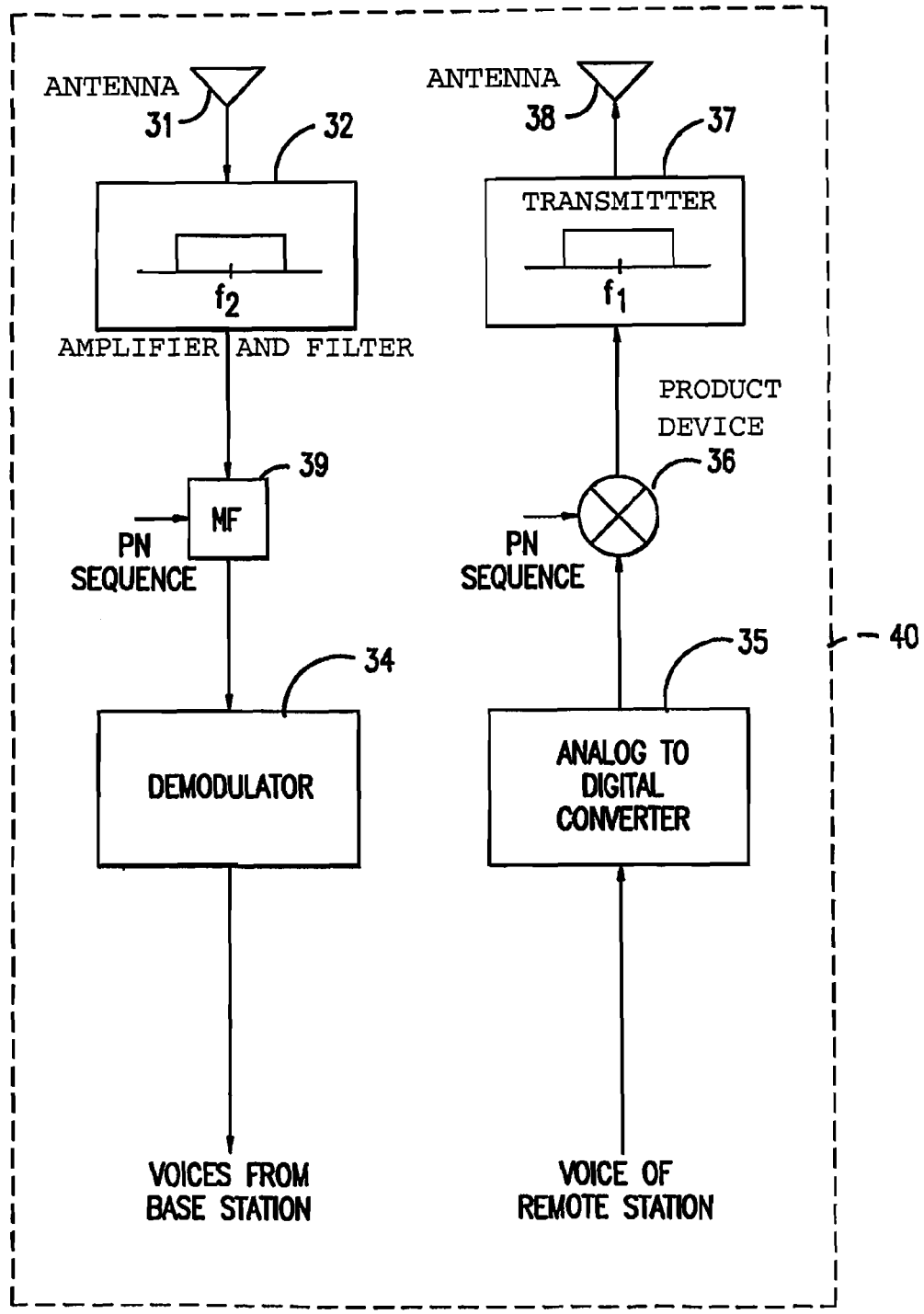
FIG. 2B is a block diagram of a remote subunit using a matched filter.

The remote subunit is illustrated in FIGS. 2A and 2B and includes a receiver portion, a transmitter portion, receiving means, despreading means, and demodulating means. The transmitting portion includes converting means, spread-spectrum processing means and transmitting means. The receiving means receives at the second frequency the base-spread-spectrum signal. The despreading means despreads the base-spread-spectrum signal as a despread-base-spread-spectrum signal. The demodulating means demodulates the despread-base-spread-spectrum signal as a base-analog signal.

The converting means converts a remote-analog signal to a remote-data signal. The remote-analog signal typically is the voice of the remote station. The base-analog signal typically is the plurality of voice signals from the base station. The spread-spectrum processing means processes the remote-data signal with a remote-chipping sequence. The transmitting means transmits at the first frequency the spread-spectrum-processed-remote-data signal as one of the plurality of spread-spectrum signals, which are received at the base subunit.

As shown in FIG. 2A, the receiving means includes an antenna 31 and RF/IF amplifier and filter circuitry 32. The despreading means and demodulating means are embodied as mixer 33 and demodulator 34, respectively. As shown in FIG. 2B, the despreading means may also be embodied as a matched filter 39. The RF/IF amplifier and circuitry 32 is coupled between antenna 31 and the mixer 33. The demodulator 34 is coupled to the mixer 33.

The base-spread-spectrum signal at antenna 31 is amplified and filtered by RF/IF. The base-spread-spectrum signal is despread by the base-chipping sequence by mixer 33 to generate the despread-base-spread-spectrum signal. The demodulator 34 demodulates the despread-base-spread-spectrum signal as a base-analog signal. The output of the demodulator 34 is the plurality of voice signals from the base station.

The transmitter section of the remote subunit may have the converting means embodied as analog-to-digital converter 35, the spread-spectrum processing means embodied as product device 36 and the transmitting means embodied as transmitter 37 coupled to antenna 38. The product device 36 is coupled between the analog-to-digital converter 35 and the transmitter 37.

The analog-to-digital converter 35 converts the voice of the remote signal, designated here as the remote-analog signal, to a remote-data signal. The remote-data signal is spread-spectrum processed by the product device 36 using remote-chipping sequence. The output of the product device 36 is the spread-spectrum-processed-remote-data signal. The transmitter 37 transmits the spread-spectrum-processed-remote-data signal using antenna 38, as one of the plurality of spread-spectrum signals. Antenna 31 and antenna 38 may be combined as a single antenna serving both functions.

Figure 3:
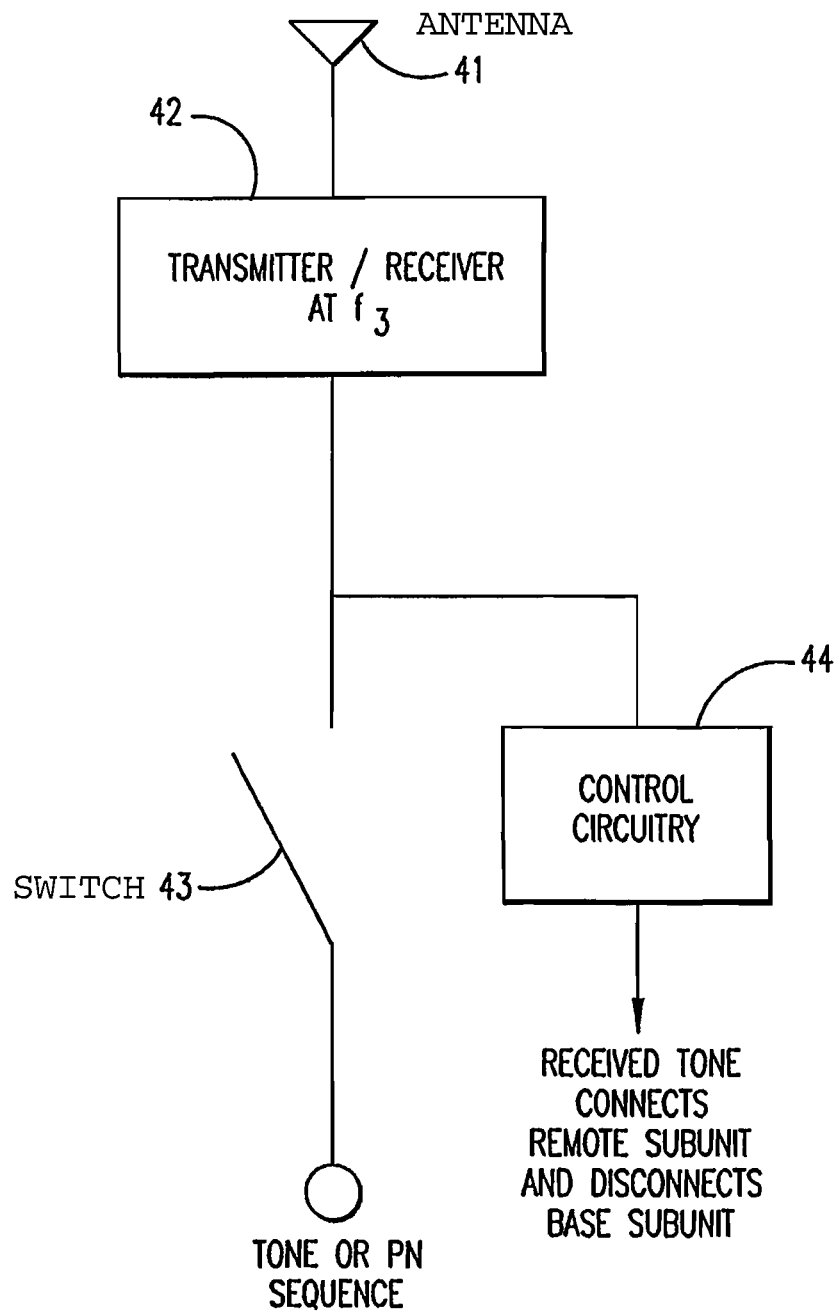
FIG. 3 is a block diagram of a command subunit.

The command subunit is illustrated in FIG. 3. The command subunit includes initiating means, broadcasting means, and receiving means. The initiating means initiates a command signal, upon activation by the local user of that spread-spectrum unit. The command signal activates the base subunit in that spread-spectrum unit. The broadcasting means broadcasts the command signal to the plurality of spread-spectrum units. The receiving means receives the command signal when broadcast from a different spread-spectrum unit. The activating means activates the remote subunit upon receiving the command signal.

The initiating means is illustrated in FIG. 3 as a push button switch 43. The broadcasting means is illustrated as a transmitter portion of the transmitter/receiver 42. The transmitter transmits at frequency $f_3$. The receiving means is illustrated as the receiver portion of transmitter/receiver 42. The receiver receives at frequency $f_3$. The transmitter/receiver 42 is coupled to antenna 41 for radiating and receiving signals. The activating means includes the necessary circuitry for disconnecting the base subunit and activating the remote subunit of a particular spread-spectrum unit. The activating means is illustrated as control circuitry 44. The present invention may also be used for data in place of voice signals.

In use, a particular spread-spectrum unit might be operating with its remote subunit activated. Thus, the remote subunit of that particular spread-spectrum unit receives at the second frequency the base-spread-spectrum signal, and despreads the base-spread-spectrum signal as a despread-base-spread-spectrum signal. The despread-base-spread-spectrum signal is demodulated. Thus, that particular spread-spectrum unit receives all of the base signals via its remote subunit. While transmitting to the plurality of spread-spectrum units, that particular spread-spectrum unit converts the voice signal, embodied as the remote-analog signal, to the remote-data signal. The remote-data signal is spread-spectrum processed and transmitted at the first frequency as one of the plurality of spread-spectrum signals.

Upon initiation of the command signal by the user of that particular spread-spectrum unit, by pushing push button 43, that particular spread-spectrum unit switches from operating with the remote subunit to operating with the base subunit. At the same time, the command signal is radiated to the other spread-spectrum units of the plurality of spread-spectrum units. Upon receiving the command signal, each of the spread-spectrum units has its remote subunit activated and thereafter works in a remote subunit mode. The particular spread-spectrum unit has then become the base station.

When operating as the base station, the particular spread-spectrum unit has its base subunit activated. Accordingly, the plurality of spread-spectrum signals transmitted from the plurality of spread-spectrum units at each unit, is received by the RF/IF amplifier and circuitry 12 via antenna 11. The plurality of spread-spectrum signals are despread by the plurality of mixers 13, 14, 15, and demodulated by the demodulator 16 which outputs a demodulated signal. The plurality of demodulated signals from combiner 17A are the voices from the plurality of remote stations. The voices from the plurality of remote stations are combined with the voice of the base station by combiner 17B, and converted by analog-to-digital converter 18 to the base-data signal. The base-data signal is spread-spectrum processed by the product device 19 and transmitted by transmitter 20 and via antenna 21 at the second frequency.

As will be appreciated by those of ordinary skill in the art, an example of the spread spectrum unit built as a totally integrated unit referenced in paragraph [0019] above is a combination of the command subunit of FIG. 3 with a base subunit of FIG. 1A or 1B and a remote subunit of FIG. 2A or 2B where the command subunit antenna 41 serves as both the transmit and receive antenna for both the base and remote subunits. Such a combination is an example of a mobile communication unit that has an antenna and circuitry configured in a first mode as a remote subunit and in a second mode as a base subunit. Such a mobile communication unit in the first mode will receive data from a first communication unit such as voices from a base station and output the base station voices to a user of the mobile communication unit as described in connection with FIGS. 2A and 2B. Such a mobile communication unit in the second mode will receive data from a communication unit such as a voice from at least one remote station and will transmit the received data to a plurality of mobile communication units, i.e. remote subunits, as described in connection with FIGS. 1A and 1B. The command subunit of such a mobile communication unit permits it to switch from the first mode to the second mode in response to an input from a user of the mobile communication unit, such as via switch 43. Accordingly, switch 43 permits a user of the mobile communication unit to switch between the first mode and the second mode in response to the user switching the switch that then serves as an input to the command subunit. It thus follows that, on a condition that the mobile communication unit is in the first mode, data is received from a first communication unit and output to the user of the mobile communication unit. It further follows that, on a condition that the mobile communication unit is in the second mode, data is received data from at least one second communication unit and transmitted data to a plurality of third mobile communication units, i.e. remote subunits.

It will be apparent to those skilled in the art that various modifications can be made to the spread-spectrum changeable base station of the instant invention without departing from the scope or spirit of the invention, and it is intended that the present invention cover modifications and variations of the spread-spectrum changeable base station provided they come within the scope of the appended claims and their equivalents.

What is claimed is:

1. A mobile communication unit comprising:
   an antenna and circuitry configured in a first mode, to receive first data from a first communication unit and to output the received data to a user of the mobile communication unit;
   the antenna and circuitry configured in a second mode, to receive second data from a second communication unit and to transmit the received second data to at least one of a plurality of third mobile communication units; and
   the antenna and circuitry configured to switch from the first mode to the second mode in response to an input from the user of the mobile communication unit.

2. The mobile communication unit of claim 1 wherein the first communication unit and the second communication unit are a same communication unit.

3. The mobile communication unit of claim 1 wherein the received data from the first communication unit is in a code division multiple access signal.

4. The mobile communication unit of claim 1 wherein the received data from the first communication unit includes voice data.

5. The mobile communication unit of claim 1 wherein the data is transmitted at a same time to the at least one of the plurality of third mobile communication units.

6. The mobile communication unit of claim 1 wherein in the second mode, the antenna and circuitry is configured to broadcast data to the at least one of the plurality of third stations.

7. The mobile communication unit of claim 1 wherein in the second mode, the circuitry is configured to further output received data from the at least one second communication unit to the user of the mobile communication unit.

8. The mobile communication unit of claim 1 wherein the mobile communication unit includes circuitry, a single integrated unit having a single antenna for transmission and reception of data.

9. A method comprising:
   switching, by a mobile communication unit, between a first mode and a second mode in response to an input from a user of the mobile communication unit;
   on a condition that the mobile communication unit is in the first mode, receiving first data from a first communication unit and outputting the received data to the user of the mobile communication unit; and
   on a condition that the mobile communication unit is in the second mode, receiving second data from at least one second communication unit and transmitting the received second data to at least one of a plurality of third mobile communication units.

10. The method of claim 9 wherein the first communication unit and the at least one second communication unit are a same communication unit.

11. The method of claim 9 wherein the received data from the first communication unit is in a code division multiple access signal.

12. The method of claim 9 wherein the received data from the first communication unit includes voice data.

13. The method unit of claim 9 wherein the data is substantially simultaneously transmitted to the at least one of plurality of third mobile communication units.

14. The method of claim 9 wherein in the second mode, broadcasting data to the at least one of plurality of third stations.

15. The method of claim 9 wherein in the second mode, the mobile communication unit outputs received data from the at least one second communication unit to the user of the mobile communication unit.

16. The method of claim 9 wherein the mobile communication unit includes a single integrated unit.

\* \* \* \* \*